(12) United States Patent
Nakanishi et al.

(10) Patent No.: US 7,977,009 B2
(45) Date of Patent: Jul. 12, 2011

(54) CELL MODULE FOR FUEL CELL, METHOD FOR FORMING CELL MODULE, AND FUEL CELL

(75) Inventors: Haruyuki Nakanishi, Susono (JP); Shigeaki Murata, Numazu (JP); Masahito Hoshino, Nagoya (JP); Hiroaki Hayashi, Chiryu (JP); Kiyomi Kozuka, Aichi-ken (JP)

(73) Assignees: Toyota Jidosha Kabushiki Kaisha, Toyota (JP); Tsuchiya Co., Ltd., Nagoya (JP)

( * ) Notice: Subject to any disclaimer, the term of this patent is extended or adjusted under 35 U.S.C. 154(b) by 1243 days.

(21) Appl. No.: 11/639,146

(22) Filed: Dec. 15, 2006

(65) Prior Publication Data
US 2007/0166603 A1 Jul. 19, 2007

(51) Int. Cl.
*H01M 8/10* (2006.01)
*H01M 8/02* (2006.01)
*H01M 4/86* (2006.01)

(52) U.S. Cl. ......... 429/497; 429/492; 429/494; 977/948
(58) Field of Classification Search .................. None
See application file for complete search history.

(56) References Cited

U.S. PATENT DOCUMENTS

2010/0227255 A1* 9/2010 Nakanishi et al. ............ 429/497

FOREIGN PATENT DOCUMENTS

| JP | A 9-223507 | 8/1997 |
| JP | A 11-503262 | 3/1999 |
| JP | A 2002-124273 | 4/2002 |
| JP | A 2002-158015 | 5/2002 |
| JP | A 2002-260685 | 9/2002 |
| JP | A 2002-289220 | 10/2002 |
| JP | 2003-297372 | * 10/2003 |
| JP | A 2004-30926 | 1/2004 |
| JP | 2004-059428 | * 2/2004 |
| JP | A 2005-129406 | 5/2005 |
| JP | 2005-353496 | * 12/2005 |
| WO | WO 96/13872 | 5/1996 |

OTHER PUBLICATIONS

Nikolaev, P., et al. "Gas-Phase Catalytic Growth of Single-Walled Carbon Nanotubes From Carbon Monoxide," *Chemical Physics Letters*, vol. 313, pp. 91-97 (1999).
Kasuga, T. *Fuel Cell*, vol. 3, No. 3, pp. 69-71 (2004).
Nogami, M. *Chemistry and Industry*, vol. 57, No. 4, pp. 410-413 (Apr. 2004).
Kuraoka, K. *Chemistry and Industry*, vol. 57, No. 1, pp. 41-44 (Jan. 2004).

* cited by examiner

*Primary Examiner* — John S Maples
(74) *Attorney, Agent, or Firm* — Oliff & Berridge, PLC

(57) ABSTRACT

A cell module for a fuel cell according to embodiments of the invention includes a hollow-core electrolyte membrane; two electrodes one of which is arranged on the inner face of the hollow-core electrolyte membrane and the other of which is arranged on the outer face of the hollow-core electrolyte membrane; and first collecting members that are connected to the respective two electrodes. At least one of the two electrodes includes nano-columnar bodies on which electrode catalysts are supported. The nano-columnar bodies are formed on at least one of the first collecting members corresponding to the at least one of the electrodes that includes the nano-columnar bodies. At least part of the nano-columnar bodies are oriented toward the hollow-core electrolyte membrane.

13 Claims, 5 Drawing Sheets

CELL MODULE FOR FUEL CELL, METHOD FOR FORMING CELL MODULE, AND FUEL CELL

BACKGROUND OF THE INVENTION

1. Field of the Invention

The invention relates generally to a cell module suitable as an electric power generation portion of a fuel cell, and, more specifically, to a cell module including a hollow-core electrolyte membrane. The invention also relates to a method for forming such cell module, and a fuel cell in which such cell module is used as a cell.

2. Description of the Related Art

In fuel cells, fuel and an oxidant are supplied to two respective electrodes electrically connected to each other, and the fuel is electrochemically oxidized, whereby chemical energy is directly converted into electric energy. Unlike thermal electric power generation, electric power generation by the fuel cells is not restricted by the Carnot cycle. Accordingly, the fuel cells exhibit high energy conversion efficiency. In polymer electrolyte fuel cells, polymer electrolyte membranes are used as electrolytes. Attention has been given to the polymer electrolyte fuel cells, particularly, as mobile electric power sources and electric power sources for movable bodies, due to their advantages that it is easy to downsize such polymer electrolyte fuel cells, the polymer electrolyte fuel cells operate at a low temperature, etc.

In the polymer electrolyte fuel cells, when hydrogen is used as fuel, the reaction indicated by the following equation (1) proceeds at the anode.

$$H_2 \rightarrow 2H^+ + 2e^- \tag{1}$$

The electrons generated by the reaction indicated by the equation (1) flow through an external circuit, work as electricity using an external load, and then reach the cathode. The protons generated by the reaction indicated by the equation (1) flow, while being hydrated with water, from the anode side to the cathode side through the polymer electrolyte membrane by electro-osmosis.

When oxygen is used as an oxidant, the reaction indicated by the equation (2) proceeds at the cathode.

$$2H^+ + (½)O_2 + 2e^- \rightarrow H_2O \tag{2}$$

The water generated at the cathode passes mainly through gas diffusion layers, and is then discharged to the outside of the fuel cell. As just described, the fuel cells are clean electric power generators that discharge only water.

Polymer electrolyte fuel cells including fuel cell stacks formed in the following manner have been mainly developed. Such fuel cell stacks are formed in the manner in which (i) a catalytic layer used as the anode is formed on one face of a flat polymer electrolyte membrane, and another catalytic layer used as the cathode is formed on the other face of the flat polymer electrolyte membrane, (ii) gas diffusion layers are formed on the respective sides of the flat membrane-electrode-assembly, and (iii) multiple flat cells, each of which is formed by arranging the membrane-electrode-assembly with the gas diffusion layers between flat separators, are stacked on top of each other.

Considerably thin proton-conducting polymer membranes are used as the polymer electrolyte membranes in order to increase the power density of the polymer electrolyte fuel cells. The proton-conducting polymer membranes having a thickness of equal to or less than 100 μm are mainly used. Even if thinner electrolyte membranes are used to further increase the power density, it is not possible to form cells that are drastically thinner than the commonly used cells. Similarly, the thickness of each of catalytic layers, gas diffusion layers, separators, etc, had been reduced. However, there is a limit to increases, due to reduction in the thickness of such members, in the power density per unit volume. For such reason, it may be difficult to meet the demand for more compact fuel cells.

In addition, there is a disadvantage that the production cost of fuel cells is high. Usually, sheet-like carbon materials having excellent corrosion resistance are used to form the separators. However, the carbon materials are expensive. In addition, grooves that serve as gas passages are usually microfabricated in the faces of the separators in order to substantially uniformly distribute fuel gas and oxidant gas to the entire faces of the flat membrane-electrode-assembly. Microfabricating such grooves makes the separators considerably expensive. This drastically increases the production cost of the fuel cells.

The above described fuel cells have many other disadvantages. For example, it is technically difficult to reliably provide sealing to the periphery of each of the multiple cells stacked on top of each other in order to prevent the fuel gas and the oxidant gas from leaking from the gas passages. Further, the electric power generation efficiency may be reduced due to deflection or deformation of the flat membrane-electrode-assemblies.

In recent years, polymer electrolyte fuel cells, in which a cell module formed by arranging electrodes on the inner side and the outer side, respectively, of a hollow-core electrolyte membrane is used as a basic unit of electric power generation, have been developed. Such technology is described, for example, in Japanese Patent Application Publication No. JP-A-09-223507 (Document 1), Japanese Patent Application Publication No. JP-A-2002-158015 (Document 2), Japanese Patent Application Publication No. JP-A-2002-260685 (Document 3), Japanese Patent Application Publication No. JP-A-2002-289220 (Document 4), and Japanese Patent Application Publication No. JP-A-2002-124273 (Document 5).

In the fuel cells including such hollow-core cell modules, members corresponding to the separators used in the flat cell modules are usually not required. In addition, the gas passages need not be formed, because different types of gases are supplied to the inner faces and the outer faces of the cell modules, respectively, to generate electric power. Accordingly, the production cost may be reduced. In addition, because the cell module has a three-dimensional shape, the specific surface area of the hollow-core cell module is greater than that of the flat cell module, which may increase the power density of electric power generation per unit volume.

It is considered that the electrode reaction occurs at a portion, at which an electrode catalyst contacts a proton-conducting substance and to which the reaction gas is supplied, namely, a three-phase interface. Accordingly, increasing the power density of the fuel cells by controlling the three-phase interface has been examined. However, under the present circumstances, it is difficult to appropriately design the three-phase interface. For example, the electrode catalysts may be buried in the proton-conducting substance, which interrupts a supply of the reaction gas. On the other hand, if the electrode catalysts are arranged at positions apart from the proton-conducting substance, a supply of protons from the proton-conducting substance or a supply of protons to the proton-conducting substance may be interrupted. Due to such inconveniences, the expensive catalysts made of noble metal are not effectively used.

Also, the electrons generated by the electrode reaction at the three-phase interface on the anode side pass through collecting member, reach the three-phase interface on the cathode side, and are used for the electrode reaction that occurs on the cathode side. Therefore, it is necessary to maintain good conduction of electricity between the electrolyte membrane and the collecting members. In order to provide conduction of electricity to the cell stack formed of the flat cells, usually, the cells are stacked on top of each other, and pressed to each other by applying relatively strong pressure. The applied pressure causes the membrane-electrode-assembly to closely contact the gas diffusion layers and the separators, thereby providing conduction of electricity.

The hollow-core cell modules lack the separators, which serve as the collecting members in the flat cells and which electrically connect the cells. Accordingly, the hollow-core cell modules require collecting members.

Document 1 describes using titanium (Ti) wires as the collecting members, and fitting the titanium wires to the electrodes that support platinum (Pt). Document 2 describes electrically connecting the ends of column-shaped electrochemical elements to each other by a conductive connecting pattern. Document 3 describes using external terminals connected to the catalytic layers as collecting members in tubular fuel cells. Document 4 describes connecting collecting electrodes to catalytic layers by lead wires. Document 5 describes installation of linear negative terminals and linear positive terminals.

As described above, it is difficult to perform design so that the three-phase interface is controlled to effectively use the electrode catalysts. In the hollow-core cell modules, it is also difficult to perform design so that the three-phase interface is controlled to effectively use the electrode catalysts.

Unlike the flat cell modules, in the hollow-core cell modules, it is difficult, due to the shape and the structure, to apply surface pressure for causing the electrodes and the collecting members to contact more closely. Accordingly, the conduction of electricity is likely to be insufficient.

When wires are used as the collecting members as described in the patent publications described above, the contact area between the electrodes and the collecting members is small. Accordingly, the conduction of electricity is more likely to be insufficient due to insufficient surface pressure.

SUMMARY OF THE INVENTION

A first aspect of the invention relates to a cell module for a fuel cell including a hollow-core electrolyte membrane; two electrodes one of which is arranged on the inner face of the hollow-core electrolyte membrane and the other of which is arranged on the outer face of the hollow-core electrolyte membrane; and collecting members that are connected to the respective two electrodes. At least one of the two electrodes includes nano-columnar bodies on which electrode catalysts are supported. The nano-columnar bodies are formed on at least one of the collecting members corresponding to the at least one of the electrodes that includes the nano-columnar bodies. At least part of the nano-columnar bodies are oriented toward the hollow-core electrolyte membrane.

With such structure, the nano-columnar bodies, which support the electrode catalytic metal particles and which are oriented toward the hollow-core electrolyte membrane, are formed on the collecting member. The area on and around the collecting member, where there are nano-columnar bodies, more specifically, the portion in the area, where there are the nano-columnar bodies oriented toward the hollow-core electrolyte membrane is used as the electrode in which the electrode catalytic metal particles are densely supported on the nano-columnar bodies. In fuel cells, the electrode reaction occurs at a portion, at which an electrode catalyst contacts a proton-conducting substance and to which the reaction gas is supplied, namely, a three-phase interface. In the above-described structure, the electrode is formed by aligning the nano-columnar bodies, on which the electrode catalytic metal particles are supported, so that the nano-columnar bodies are oriented toward the hollow-core electrolyte membrane. Accordingly, the reaction gas supplied for the electric power generation easily comes close to the three-phase interface, and is uniformly dispersed. As a result, the electrode catalytic metal particles supported on the nano-columnar bodies are effectively used for the electrode reaction.

A second aspect of the invention relates to a fuel cell including the cell module according to the first aspect of the invention. With such structure, a great output of power generation is produced, because the hollow-core electrolyte membrane is provided and appropriate electric connection among the components is maintained.

A third aspect of the invention relates to a method for forming a cell module for a fuel cell. According to the method, first, a first collecting member, on which nano-columnar bodies are formed, is fixed onto the outer face of a first hollow-core conductor. Then, electrode catalysts are caused to be supported on the nano-columnar bodies formed on the outer face of the first collecting member. A hollow-core electrolyte membrane is then formed by applying an electrolyte onto the first collecting member after the electrode catalysts are caused to be supported on the nano-columnar bodies formed on the first collecting member. A second collecting member, on which nano-columnar bodies are formed, is fixed onto the outer face of the hollow-core electrolyte membrane. Then, electrode catalysts are caused to be supported on the nano-columnar bodies formed on the second collecting member. Finally, a second hollow-core conductor is fixed onto the second collecting member after the electrode catalysts are caused to be supported on the nano-columnar bodies formed on the second collecting member.

In the structure formed in the above-described manner, the area(s) on and around the first collecting member or/and the second collecting member, in which there are the nano-columnar bodies, serve(s) as the electrode formed integrally with the collecting member. At the electrode including the nano-columnar bodies, the reaction gas efficiently reaches the electrode catalytic metal particles densely supported on the nano-columnar bodies, and the three-phase interface near the electrode catalytic metal particles. Accordingly, the electrode catalytic metal particles supported on the nano-columnar bodies effectively contribute to the electrode reaction, which increases the electric power generation efficiency.

In the cell module according to the aspects of the invention, the nano-columnar bodies, which support the catalysts, are connected, at one ends, to the collecting member, and the other ends of the nano-columnar bodies are oriented toward the hollow-core electrolyte membrane. Accordingly, the electric charges are smoothly exchanged between the electrode and the collecting member/the hollow-core electrolyte membrane. Accordingly, even in a cell module that includes a hollow-core electrolyte membrane with which it is difficult to apply an external surface pressure, appropriate electric connection between the electrode and the collecting member is maintained, and the internal resistance of the cell module is reduced. Therefore, the cell module exhibits high electric power generation efficiency, and the fuel cell formed by gathering such cell modules together has excellent electric power generation efficiency.

BRIEF DESCRIPTION OF THE DRAWINGS

The forgoing and/or further objects, features and advantages of the invention will become more apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

In the following description, the invention will be described in more detail in terms of example embodiments.

Figure 1:
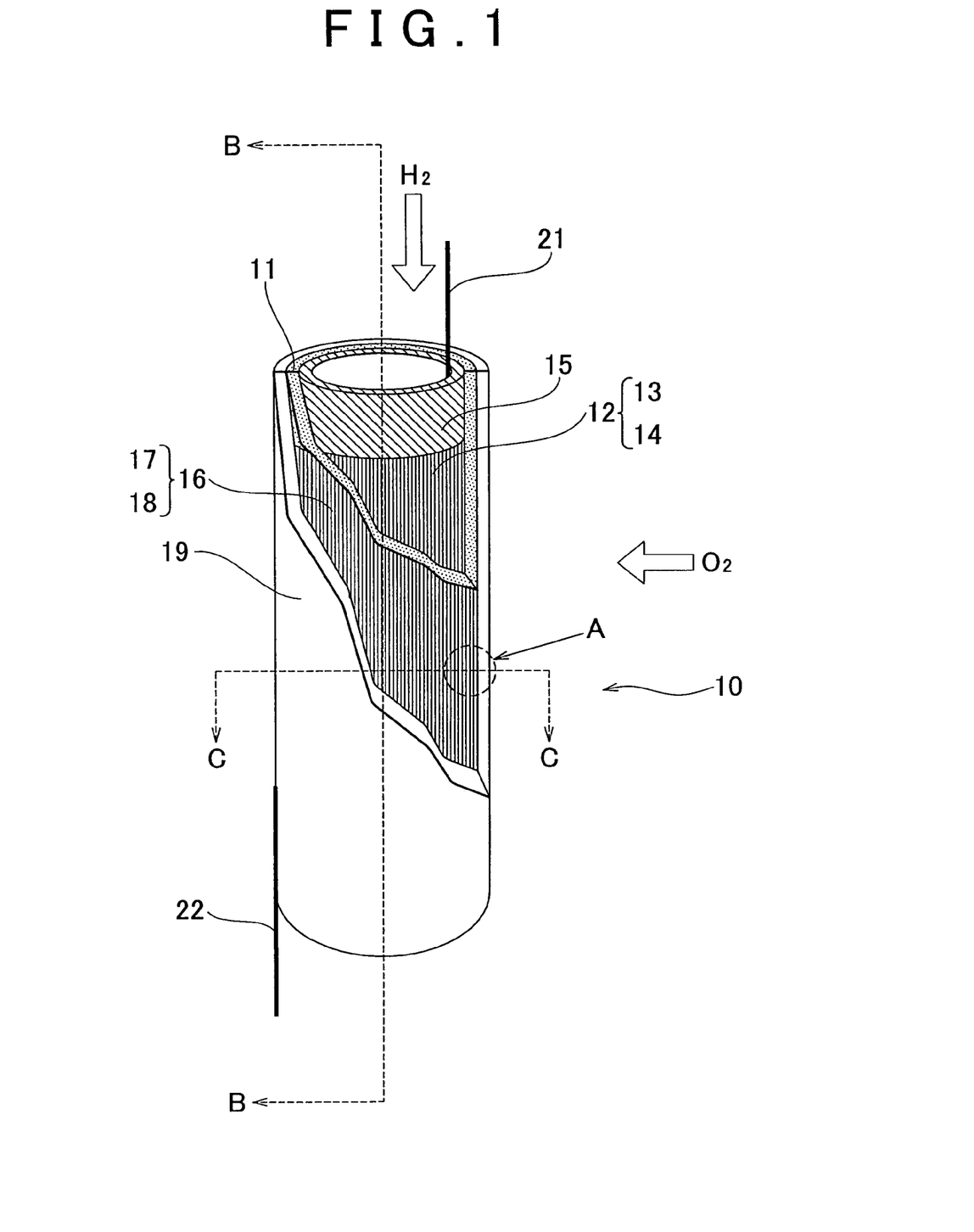
FIG. 1 is the perspective view schematically showing a cell module according to a first embodiment of the invention.
Figure 2:
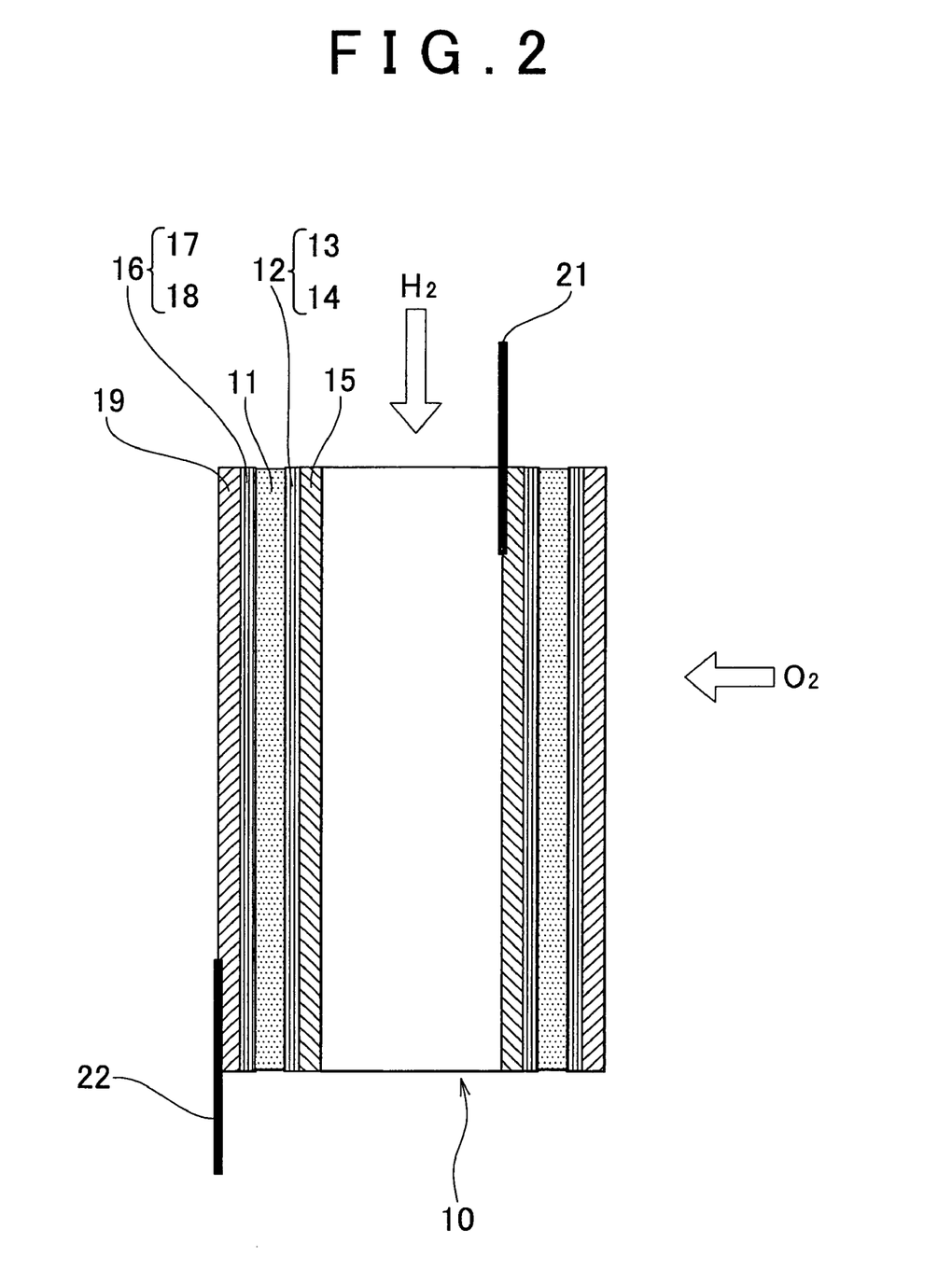
FIG. 2 is the cross-sectional view of the cell module according to the first embodiment of the invention, which is obtained when the cell module is cut by a plane extending in the longitudinal direction of the cell module.
Figure 3:
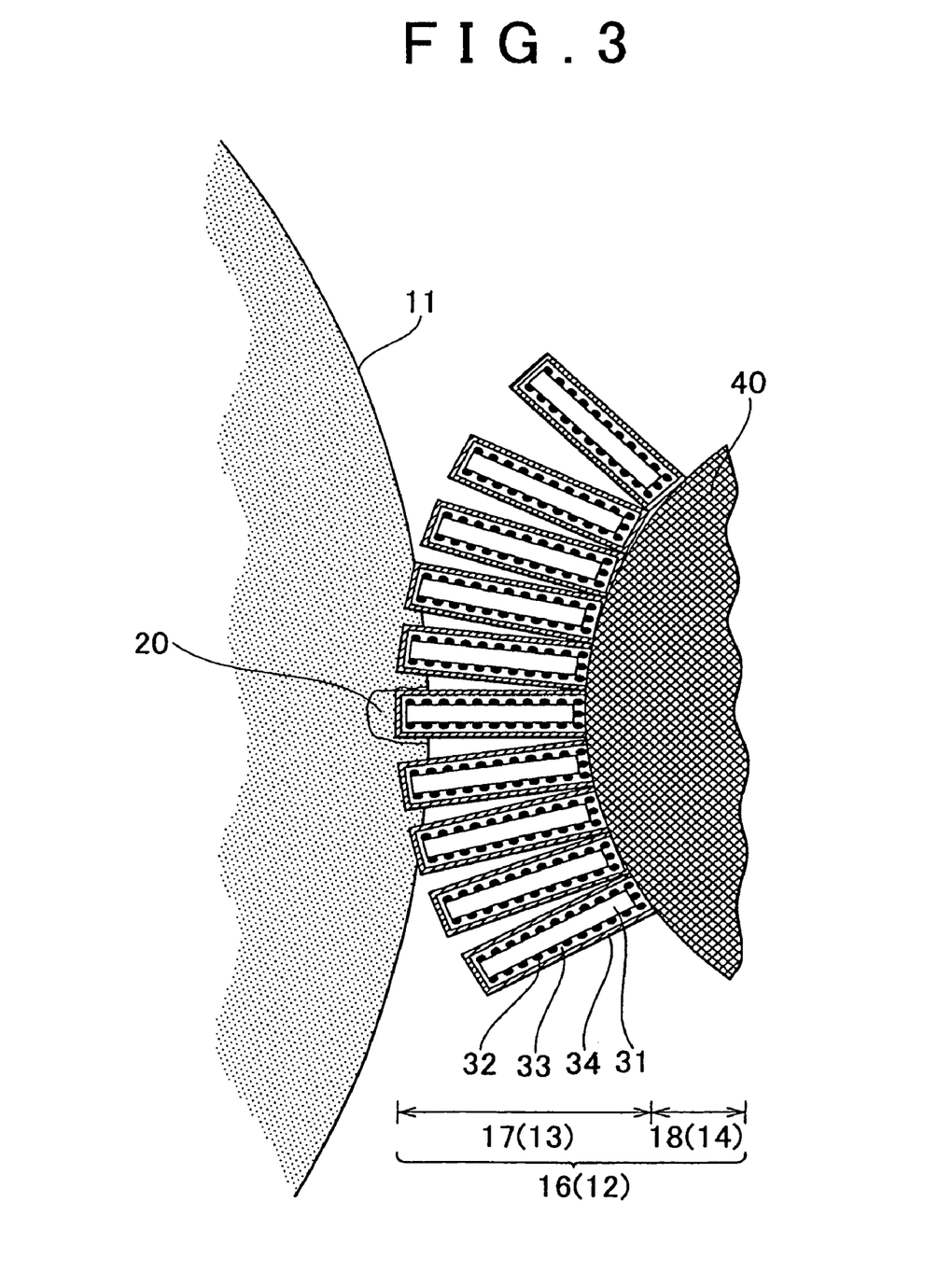
FIG. 3 is the enlarged view of the area A surrounded by the dot line in FIG. 1, showing the cross-section taken along line C-C in FIG. 1.

Hereafter, a first embodiment of the invention will be described. FIG. 1 is the perspective view schematically showing a cell module 10 according to the first embodiment of the invention. In the cell module 10, two electrodes are arranged on the inner face and the outer face of a hollow-core (tubular) fluorine ion-exchange resin membrane (a hollow-core electrolyte membrane) 11, respectively, and collecting members are arranged on the respective electrodes. FIG. 2 is the cross-sectional view taken along line B-B in FIG. 1, that is, the cross-sectional view of the cell module 10 according to the first embodiment of the invention, which is obtained when the cell module 10 is cut by a plane extending in the longitudinal direction of the cell module 10. FIG. 3 is the enlarged view of the area A surrounded by the dot line in FIG. 1, showing the cross-section taken along line C-C in FIG. 1.

As shown in FIGS. 1, 2, and 3, the cell module 10 is a hollow-core (tubular) member that is open at both ends. A first carbon fiber layer (a CNT fixation collecting member) 12 is arranged on the inner side of the tubular fluorine ion-exchange resin membrane 11. A first SUS pipe 15 is arranged on the inner side of the first carbon fiber layer 12. A second carbon fiber layer (a CNT fixation collecting member) 16 is arranged on the outer side of the fluorine ion-exchange resin membrane 11. A second SUS pipe 19 is arranged on the outer side of the second carbon fiber layer 16. Conductive wires 21, 22 are fitted to the first SUS pipe 15 and the second SUS pipe 19, respectively.

As shown in FIGS. 1 and 3, the second carbon fiber layer 16 is formed by aligning carbon fibers 40 in the longitudinal direction of the cell module 10 so that the outer face of the hollow-core electrolyte membrane 11 is covered with the carbon fibers 40. On the surfaces of the carbon fibers 40, carbon nanotubes (nano-columnar bodies) 31 that support electrode catalytic metal particles 32 are formed. The second carbon fiber layer 16 is formed by integrating a second electrode (an outer electrode) 17, formed by gathering multiple carbon nanotubes 31, with a second collecting member (an outer collecting member) 18, formed by gathering the carbon fibers 40. The first carbon fiber layer 12 has the same structure as that of the second carbon fiber layer 16. As shown by the parenthesized reference numerals in FIG. 3, the first carbon fiber layer 12 is formed by integrating a first electrode (an inner electrode) 13, formed by gathering multiple carbon nanotubes 31, with a first collecting member (an inner collecting member) 14, formed by gathering carbon fibers 40.

The first SUS pipe 15 is a collecting-assist member that is arranged on the inner side of the tube to reinforce the first carbon fiber layer 12 and assist the first carbon fiber layer 12 in collecting electric charges. Similarly, the second SUS pipe 19 is a collecting-assist member that is arranged on the outer side of the tube to reinforce the second carbon fiber layer 16 and assist the second carbon fiber layer 16 in collecting electric charges.

In this case, on the inner side of the hollow-core electrolyte membrane 11, the electrode and the collecting member are integrally formed from the first carbon fiber layer (the CNT fixation collecting member) 12 and the first SUS pipe 15. Similarly, on the outer side of the hollow-core electrolyte membrane 11, the electrode and the collecting member are integrally formed from the second carbon fiber layer 16 and the second SUS pipe 19.

The hollow-core electrolyte membrane (the fluorine ion-exchange resin membrane 11, in the first embodiment) is a hollow-core member that is open at both ends. Accordingly, separators are not required, and a large electrode area, which is used for electric power generation, is obtained.

Although not limited to certain values, the outer diameter of the hollow-core electrolyte membrane 11 is preferably 0.01 mm to 10 mm, more preferably 0.1 mm to 1 mm, and optimally 0.1 mm to 0.5 mm. Under the present circumstances, it is technically difficult to form the hollow-core electrolyte membrane 11 having an outer diameter of less than 0.01 mm. However, if the outer diameter of the hollow-core electrolyte membrane 11 exceeds 10 mm, the surface area with respect to the occupied volume is not sufficient. Accordingly, the effects of increasing the power output per unit volume of the cell module may not be sufficiently produced.

Preferably, the fluorine ion-exchange resin membrane 11 is thin, from the viewpoint of enhancement of proton-conductivity. However, if the fluorine ion-exchange resin membrane 11 is excessively thin, the function of separating gases decreases, resulting in increases in the amount of aprotic hydrogen that permeates through the fluorine ion-exchange resin membrane 11. In the fuel cell formed of the hollow-core cell modules 10 according to the first embodiment of the invention, a large electrode area used for electric power generation is obtained. Accordingly, even if a rather thick membrane is used, the fuel cell according to the first embodiment of the invention produces sufficient output, as compared to the fuel cells, according to the related art described above, formed by stacking the flat cells on top of each other. From such viewpoint, the thickness of the fluorine ion-exchange resin membrane 11 is usually 10 μm to 100 μm, preferably 50 μm to 60 μm, and more preferably 50 μm to 55 μm.

Based on the preferable outer diameter and thickness of the fluorine ion-exchange resin membrane 11, the inner diameter of the fluorine ion-exchange resin membrane 11 is preferably 0.01 mm to 10 mm, more preferably 0.1 mm to 1 mm, and optimally, 0.1 mm to 0.5 mm.

Preferably, the fluorine ion-exchange resin membrane 11 is formed of a polymer having a polyolefin skeleton where part or entire of hydrogen is replaced with fluorine, and has a proton exchange group in a side chain. Examples of preferable proton exchange groups are a sulfonic acid group, a phosphonic acid group, and a phosphate group. Particularly preferable fluorine ion-exchange resin membrane is a perfluorocarbon polymer having a sulfonic acid group (a perfluorocarbon sulfonic acid polymer). Commercially available polymers such as Nafion produced by DuPont or Flemion produced by Asahi Glass Co., Ltd may be used as the perfluorocarbon sulfonic acid polymer.

Preferably, the weight-average molecular weight of the polymer forming the fluorine ion-exchange resin membrane 11 is 5000 or greater, from the viewpoint of durability.

Because the cell module 10 according to the first embodiment of the invention is hollow, the specific surface area is greater than that of a flat cell. Accordingly, even if a hollow-core electrolyte membrane having a proton-conductivity lower than that of the fluorine ion-exchange resin membrane is used as the hollow-core electrolyte membrane 11, it is possible to produce a fuel cell having a high power density per unit volume. Therefore, any types of hollow-core electrolyte membranes having proton-conductivity may be used as the hollow-core electrolyte membrane 11. For example, when the invention is applied to a solid oxide fuel cell or a polymer electrolyte fuel cell in which hydroxide ions are used as the charge carriers, a hollow-core electrolyte membrane, through which other ions such as oxygen ions or hydroxide ions that serve as charge carriers pass, may be used as the hollow-core electrolyte membrane 11.

Examples of hollow-core electrolyte membranes having proton-conductivity, other than the fluorine ion-exchange resin membrane, will be described below. An example of the hollow-core electrolyte membrane, in which carbon hydride such as polyolefin is used as a skeleton and which contains at least one of proton exchange groups such as the sulfonic acid group, the phosphonic acid group, and the phosphate group, is a polystyrene cation exchange membrane containing the sulfonic acid group. Another example of the hollow-core electrolyte membrane is a solid polymer electrolyte membrane formed of a complex of a strong acid with a basic polymer, formed by doping a basic polymer such as polybenzimidazole, polypyrimidine, or polybenzoxazole with a strong acid. Such solid polymer electrolyte membrane is described, for example, in Japanese Patent Application Publication No. JP-A-11-503262. Other examples include inorganic proton conductors such as hydrogelated phosphate glass described in page 69, No. 3, Vol. 3 of "Fuel Cell" written by Toshihiro Kasuga (issued in 2004) or a proton conductor formed of porous glass described in page 410, No. 4, Vol. 57 of "Chemistry and Industry" written by Masayuki Nogami (issued in 2004). An organic-inorganic hybrid solid electrolyte membrane, to which proton-conductivity is imparted by introducing organic compounds in the pores of porous glass, may be used. This organic-inorganic hybrid solid electrolyte membrane is described in page 41, No. 1, Vol. 57 of "Chemistry and Industry" written by Koji Kuraoka, Takashi Kikukawa, and Tetsuo Yazawa (issued in 2004).

The carbon fiber layers 12, 16 that are the CNT fixation collecting members are formed by aligning multiple carbon fibers in the longitudinal direction of the cell module 10. The first carbon fiber layer 12 is arranged on the inner side of the cell module 10, at a position between the first SUS pipe 15 and the fluorine ion-exchange resin membrane 11. The second carbon fiber layer 16 is arranged on the outer side of the cell module 10, at a position between the second SUS pipe 19 and the fluorine ion-exchange membrane 11. The multiple carbon fibers, which form the first carbon fiber layer 12, are fused onto the outer face of the first SUS pipe 15 while covering the outer face of the first SUS pipe 15. As a result, the multiple carbon fibers are firmly bonded onto the outer face of the first SUS pipe 15. The multiple carbon fibers, which form the second carbon fiber layer 16, are aligned to cover the outer face of the fluorine ion-exchange resin membrane 11, and then pressed by the second SUS pipe 19 from the outside. As a result, the multiple carbon fibers are firmly bonded onto the outer face of the fluorine ion-exchange resin membrane 11.

In the first embodiment of the invention, the carbon fiber layers 12, 16 are used as the CNT fixation collecting members. However, the CNT fixation collecting members are not limited to the carbon fiber layers 12, 16. For example, layers, which are made of conductive material and on which nanocolumnar bodies such as carbon nanotubes are fixedly held, may be used as the CNT fixation collecting members. As the CNT fixation collecting member, for example, a carbon porous body such as carbon cloth or carbon paper; an aggregate of metal wires made of metal such as Au, Pt, Ag, Al, Cu, Fe, Ni, Cr, Ta, Ti, Zr, Sm or In or an alloy of the these metals, for example, stainless steel; a metal porous body such as a metal felt made of a metal selected from various metals or a metal alloy, for example, nickel felt, a metal mesh made of a metal selected from various metals or a metal alloy, or a metal foam made of a metal selected from various metals or a metal alloy; an aggregate of conductive resin linear materials; a conductive resin porous body such as cloth or foam made of conductive resin; or a porous body coated, for example, with metal, or conductive resin may be used. Among these materials, it is preferable to use carbon material such as carbon fibers, carbon cloth, or carbon paper; a metal wire or porous body that has excellent corrosion resistance such as Ti and Ni; or a wire or a porous body made of a metal alloy that has excellent corrosion resistance, for example, various types of stainless, because these materials have excellent corrosion resistance. It is more preferable to use an aggregate of carbon fibers, because the aggregate of carbon fibers hold the nanocolumnar bodies reliably.

Next, the microscopic structure of the second carbon fiber layer 16 and electric connection between the second carbon fiber layer 16 and the fluorine ion-exchange membrane 11 will be described with reference to FIG. 3. The microscopic structure of the first carbon fiber layer 12 is substantially the same as that of the second carbon fiber layers 16. Also, the electric connection between the first carbon fiber layer 12 and the fluorine ion-exchange resin membrane 11 is substantially the same as that between the second carbon fiber layer 16 and the fluorine ion-exchange resin membrane 11. Accordingly, the description concerning the microscopic structure of the first carbon fiber layer 12 and the electric connection between the first carbon fiber layer 12 and the fluoride ion-exchange resin layer 11 will not be provided below.

As shown in FIG. 3, the carbon nanotubes 31, each of which has the length of approximately 500 μm and the outer diameter of approximately 10 nm, are connected, at one ends, to the outer faces of the carbon fibers 40, which form the second carbon fiber layer 16, so that the carbon nanotubes 31 extend substantially perpendicularly from the outer faces of the carbon fibers 40. Part of the carbon nanotubes 31 connected to the carbon fibers 40 are oriented toward the fluorine ion-exchange resin membrane 11. Part of the carbon nanotubes 31, which are oriented toward the fluorine ion-exchange resin membrane 11, may be fitted in pores 20, each of which has a diameter of 5 nm to 10 nm and which are formed in the fluorine ion-exchange resin membrane 11. The carbon nanotubes 31, which fit in the pores 20, are connected, at one ends, to the carbon fibers 40, and connected, at the other ends, to the electrolyte membrane 11, whereby the alignment and orientation of the carbon nanotubes 31 are stably maintained.

Preferably, the length of each carbon nanotube 31 is equal to or longer than 200 μm. If the length of the carbon nanotube 31 is shorter than 200 μm, the distance between the carbon fiber layers 12, 16 and the fluorine ion-exchange resin membrane 11 is insufficient. Accordingly, the supply amount and the dispersion amount of reaction gas components may be reduced, resulting in reduction in the electric power generation efficiency.

In the first embodiment of the invention, the carbon nanotubes (CNT) 31 are used as the nano-columnar bodies. However, the nano-columnar bodies are not limited to the carbon nanotubes 31. For example, substance, which has a long and thin fine structure and a nano-size diameter, such as nanoglass may be used as the nano-columnar body. Usually, the average diameter ((longest diameter+shortest diameter)/2)) of the nano-columnar body is equal to or less than 100 nm and the aspect ratio of the average diameter is equal to or greater than 10. Especially, it is preferable that the average diameter be 10 nm to 50 nm, and the aspect ratio of the average diameter be equal to or greater than 100. If catalysts are supported on the nano-columnar body having a nano-sized diameter, the amount of catalysts supported on the surface of the nano-columnar body is great. In addition, according to the first embodiment of the invention, the nano-columnar bodies are oriented toward the hollow-core electrolyte membrane 11. Accordingly, each of the nano-columnar bodies does not entirely bury in the hollow-core electrolyte membrane 11, and, consequently, a large catalyst surface used for electrode reaction is obtained. Examples of such nano-columnar bodies include single or multi layer carbon nanotubes or carbon nanohorns, glass nano-columnar bodies, ceramic nano-columnar bodies, metal nano-columnar bodies, and polymer nano-columnar bodies. It is preferable to use the single or multi layer carbon nanotubes or carbon nanohorns, because they have high electric conductivity. It is particularly preferable to use the nanotubes such as carbon nanotubes.

The carbon nanotubes 31 may be synthesized by known synthesis methods such as the arc discharge method; the laser evaporation method; the CVD method in which catalytic metal for forming carbon nanotubes (hereinafter, referred to as "CNT forming catalytic metal") is used, and the carbon nanotubes are synthesized, for example, by supplying hydrocarbon gas or hydrogen gas to the CNT forming catalytic metal; or the HiPco method in which the carbon nanotubes are synthesized by causing a disproportionation reaction of carbon monoxide under the condition where the temperature and the pressure are high ($CO+CO \rightarrow C+CO_2$) (refer, for example, to P. Nikolaev, M. J. Bronikowski, R. K. Bradley, F. Rohmund, D. T. Colbert, K. A. Smith, R. E. Smalley, Chem. Phys. Lett. 313 (1999) 91-97).

As the electrode catalytic metal particles 32 that cause the cell reaction, platinum (Pt) particles having an average grain diameter of 2 nm are supported on the carbon nanotubes 31. Using the linear carbon nanotubes 31 as the carries makes it possible to obtain a large surface area and to highly densely support the electrode catalytic metal particles 32. In addition, even under the condition where water is excessively produced during electric power generation, the gas is supplied to the three-phase interface and dispersed, and, therefore, a large drop in the voltage (concentration overvoltage) is suppressed.

Preferably, the average grain diameter of the electrode catalytic metal particles 32 is equal to or less than the outer diameter of the carbon nanotube 31. More preferably, the average grain diameter of the electrode catalytic metal particles 32 is 1 nm to 3 nm. If the outer diameter is less than 1 nm, it is difficult to actually form the carbon nanotube and to offer effects of the catalytic metal. On the other hand, if the outer diameter is greater than 3 nm, the catalytic efficiency is reduced. In a fuel cell made of such electrode catalytic metal particles, it is difficult to obtain high voltage.

The electrode catalytic metal particles 32 according to the first embodiment of the invention are the platinum (Pt) particles. Because the cell module 10 according to the first embodiment of the invention is hollow, the electrode area per unit volume is greater than that of a flat cell. In addition, the electrode catalysts are highly densely supported on the surfaces of the long and thin nanotubes. The electrode catalytic metal particles 32 are not limited to the platinum (Pt) particles. Even if catalysts made of metal which is less active than platinum (Pt) are used, it is possible to produce a fuel cell having a high power density per unit volume. Any catalytic materials, which have catalysis on the oxidation reaction of fuel gas such as hydrogen or liquid fuel such as methanol at the anode (the fuel electrode), or reduction reaction of an oxidant such as oxygen at the cathode (the air electrode), may be used. The catalytic material may be selected from metals such as platinum, ruthenium, iridium, rhodium, palladium, osmium, tungsten, lead, iron, chrome, cobalt, nickel, manganese, vanadium, molybdenum, gallium, and aluminum, and alloys formed by combining these metals. Preferably, the catalytic metal is Pt or an alloy of Pt and another metal, for example, Ru.

The platinum (Pt) particles (the electrode catalytic metal particles 32) may be caused to be supported on the surfaces of the carbon nanotubes 31, for example, by using a diluted solution obtained by diluting a platinum chemical containing a chlorophatinic acid or a platinum nitric acid with a solvent, for example, alcohol. This will be described later in detail.

As shown in FIG. 3, Nafion layers 33 are formed on the outer faces of the carbon nanotubes 31 by applying Nafion solution (Aldrich Chemical Company, Inc.) onto the outer faces of the carbon nanotubes 31, on which the electrode catalytic metal particles 32 are supported. The Nafion layers 33 serve as the proton-conducting substance, whereby proton-conductivity near the nano-columnar bodies and the strength, with which the fluorine ion-exchange resin membrane 11 is connected to the nano-columnar bodies, are sufficiently obtained.

In the first embodiment of the invention, Nafion is used as the proton-conducting substance. However, any materials from which proton-conducting membranes are formed may be used. Preferably, the same material as that of the hollow-core electrolyte membrane is used.

The thickness of the proton-conducting substance such as the Nafion layer 33 is preferably 1 nm to 70 nm, and more preferably 10 nm to 30 nm. If the thickness is less than 1 nm, the protons may not be sufficiently supplied to the electrode catalytic metal particles supported on the carbon nanotubes 31 or the protons may be not be sufficiently supplied from the electrode catalytic metal particles. On the other hand, if the thickness of the proton-conducting substance such as the Nafion layer 33 exceeds 70 nm, the proton-conducting substance excessively covers the carbon nanotubes 31, which may make it difficult to supply gas to the electrode catalytic metal particles supported on the carbon nanotubes 31.

PTFE layers 34 formed of polytetrafluoroethylene (a water-repellent material; PTFE) are further formed on the Nafion layers 33 formed on the carbon nanotubes 31. The PTFE layers 34 serve as water-repellent layers. Forming the PTFE layers 34 makes it possible to reliably discharge the water produced by the cell reaction. The PTFE layers 34 may be formed on at least part of the surfaces of the Nafion layers 33. Also, part of PTFE may enter the Nafion layers 33.

It is preferable to use at least one type of fluorine resin selected from various types of fluorine resins as the water-repellent material. However, the water-repellent material is not limited certain types of materials. As the water-repellent material, for example, polyvinylidene-fluoride (PVDF), polytetrafluoroethylene, perfluoroalkoxyalkane, or ethylene-tetrafluoroethylene polymer may be used. Alternatively, these materials may be used in combination.

The carbon fiber layers 12, 16 serve as the electrodes as well as the collecting members. Accordingly, other collecting bodies need not be provided. However, the strength and the ability of collecting electric charges may not be sufficiently achieved only by the carbon fiber layers 12, 16. Therefore, according to the first embodiment of the invention shown in FIGS. 1 and 2, the SUS pipes 15, 19 are used as the collecting-assist members in order to enhance the effects of collecting electric charges while firmly fixing the carbon fiber layers 12, 16. Namely, the first carbon fiber layer 12 is fused onto the outer face of the first SUS pipe 15. The, the first SUS pipe 15 is arranged on the inner side of the hollow-core electrolyte membrane 11. As a result, the first carbon fiber layer 12 is firmly fixed between the first SUS pip 15 and the hollow-core electrolyte membrane 11. With such structure, the electric charges generated by the electrode reaction are reliably collected, and the cell module 10 exchanges the electric charges with an external circuit through the conductive wire 21. The second SUS pipe 19 arranged on the outer side of the hollow-core electrolyte membrane 11 covers the second carbon fiber layer 16 formed on the outer face of the fluorine ion-exchange resin membrane 11. As a result, the second carbon fiber layer 16 is firmly fixed between the second SUS pipe 19 and the fluorine ion-exchange resin membrane 11. With such structure, the electric charges generated by the electrode reaction are reliably collected, and the cell module 10 exchanges the electric charges with an external circuit through the conductive wire 22.

In the first embodiment of the invention, the SUS pipes 14, 15, which are the hollow-core conductors, are used as the collecting-assist members. However, any conductive materials that support the CNT fixation collecting members may be used as the collecting-assist members. As such conductive materials, it is preferable to use metal selected from various metals or an alloy of the various metals. For example, it is preferable to use metal such as Ag, Al, Cu, Fe, Ni, Cr, Ta, Ti, Zr, Sm, or In, or an alloy of these metals, for example, various types of stainless steel. Among the various metal materials, stainless or titanium is preferably used, because stainless and titanium have particularly excellent corrosion resistance. Alternatively, metal, plastic, glass or ceramic coated, for example, with Au, Pt, or conductive resin may be used. Conductive ceramics such as $TiB_2$ ceramic or $ZrB_2$ ceramic may be used. Carbon materials having a sufficient strength with which the carbon materials are prevented from crushing during production may be used. Materials imparted with conductivity by dispersing the conductive materials into the non-conductive materials may be preferably used.

The first and second SUS pipes 15, 19, which are used as the collecting-assist members, have tubular shapes and have, in the wall portions thereof, multiple pores (not shown) through which reaction gas permeates. The tubular conductors having high rigidity reliably fix the CNT fixation collecting members, and efficiently correct electric charges using the wall portions having large surface areas. Accordingly, such tubular conductors are preferably used as the collecting-assist members.

When the tubular conductor having high rigidity is arranged, as the first collecting-assist member, on the inner side of the hollow-core electrolyte membrane 11, the tubular conductor may be used as the base body on which the first CNT fixation collecting member, the electrolyte membrane, etc. are formed. For example, the first CNT fixation collecting member, the electrolyte membrane, etc. may be formed on the hollow-core conductor, for example, by application. In this manner, the cell module 10 is easily formed.

The reaction gas such as the fuel gas or the oxidizing gas or the liquid fuel such as methanol passes through the pores, formed in the wall portion of the hollow-core conductor, in the radial direction of the hollow-core conductor. Examples of such hollow-core conductor include a porous conductor made of a material selected from various materials and a tubular coiled conductor formed of a closely wound spring.

As the collecting-assist members, it is preferable to use porous hollow-core conductors. It is particularly preferable to use the SUS pipes, because the SUS pipes are easily-available and have excellent corrosion resistance. However, because the outer collecting-assist member is not used as the base body when the cell module 10 is formed, any materials may be used as the outer collecting-assist member as long as the outer collecting-assist member made of the selected material is able to press the second carbon fiber layer 16 from the outside. Accordingly, not only the porous hollow-core conductor but also any conductive materials having any shapes may be used as the outer collecting-assist member. Also, straight wires, a roughly wound spring wire or a rough mesh may be used as the outer collecting-assist member.

When required, the carbon fiber layers (the CNT fixation collecting members) 12, 16 and the SUS pipes (hollow-core conductors) 15, 19 may be connected to each other, respectively, by a conductive adhesive agent, for example, Ag paste.

In the first embodiment of the invention, the carbon fiber layers 12, 16, namely, the CNT fixation collecting members (which are formed by integrating the electrodes having nanotubes with the collecting members) are formed on the inner side and the outer side of the hollow-core electrolyte membrane 11, respectively. However, the CNT fixation collecting member may be arranged on only one of the inner side and the outer side of the hollow-core electrolyte membrane 11.

Hereafter, an example of the method for forming nano-columnar bodies on the collecting members will be described. The case, where single layer carbon nanotubes are formed on the carbon fibers that are the base bodies of the CNT fixation collecting member, using carbon nanotube (CNT) forming catalysts, will be described below.

First, the base body cleaning step is performed, when required. In the base body cleaning step, the surfaces of the base bodies (the carbon fibers, in the first embodiment), on which the carbon nanotubes will be formed, are cleaned. The surfaces of the base bodies are cleaned by heating the carbon fibers that are the base bodies in an electric furnace under vacuum.

Next, the CNT forming catalyst supporting step is performed. More specifically, the CNT forming catalyst supporting bodies (CNT forming catalyst supporting carbon fibers), on which the carbon nanotubes will be formed, are formed by causing the base bodies to support the CNT forming catalytic metal particles. The forming method is not limited to a certain method. For example, the CNT forming catalytic metal such as Fe may be uniformly broken into particles and then the Fe particles may be caused to be supported on the base bodies, for example, by evaporation coating.

Examples of the CNT forming catalytic metal include not only Fe but also Pd, Co, Ni, W, Mo, Mn and alloys of these metals. The carbon fibers are used as the base bodies, in the first embodiment of the invention. Alternatively, another collecting member described above may be used as the base body. According to the first embodiment of the invention, the CNT forming catalytic metal formed of Fe is uniformly deposited onto the base bodies so that the thickness of the CNT forming catalytic metal is a desired value (4 nm). Thus, the CNT forming catalyst supporting bodies are formed.

Next, the carbon nanotube forming step is performed. More specifically, the CNT forming catalyst supporting bodies are heated, under vacuum, to a predetermined temperature at which the carbon nanotubes are appropriately formed, and source gas (e.g., hydrocarbon gas, alcohol gas, and hydrogen gas) for the nanotubes is supplied to the CNT forming catalyst supporting bodies, whereby the carbon nanotubes are formed on the CNT forming catalyst supporting bodies. Thus, the CNT fixation collecting member (the CNT fixing carbon fibers) is formed. The diameter of the carbon nanotube is adjusted, for example, by adjusting the supply flow amount of the source gas, the reaction temperature of the source gas and the retention temperature, changing the size (the grain diameter) of the CNT forming catalytic metal particle, or further heating the carbon nanotubes at a temperature of 1500° C. to 1850° C. The diameter of the carbon nanotube is adjusted also by controlling the properties of the source gas based on the shape such as the layer structure, the diameter, and the length, and the orientation of the carbon nanotube to be formed, for example, by ionizing the source gas using, for example, an ion gun.

It is possible to efficiently form carbon nanotubes each of which has a diameter of equal to or greater than 200 μm by causing the source gas to flow on the surfaces of the CNT forming catalyst supporting bodies at a flow rate of equal to or higher than 2 mm per second (2 mm/sec).

Preferably, the temperature of the CNT forming catalyst supporting bodies is equal to or higher than 400° C. when the source gas is supplied thereto. If the temperature of the CNT forming catalyst supporting bodies is equal to or higher than 400° C. when the source gas is supplied thereto, it is possible to form the carbon nanotubes at a speed at the mass production level, and to stably form the carbon nanotubes that are uniform in diameter, length, and orientation. Especially, if the temperature of the CNT forming catalyst supporting bodies is 500° C. to 1000° C., it is possible to form the homogeneous carbon nanotubes more efficiently. Preferably, the ambient pressure under vacuum in the carbon nanotube forming step is approximately $10^{-3}$ Pa to approximately 10 Pa.

Examples of the source gas include hydrocarbon gas, alcohol gas, and hydrogen gas. More specifically, at least one of hydrocarbon gas and alcohol gas may be used. Alternatively, at least one of hydrocarbon gas and alcohol gas, and at least one type of hydrogen gas selected from various types of hydrogen gases (gasificated, if necessary) may be both used. As the hydrocarbon component of the hydrocarbon gas, hydrocarbon having a carbon number of 1 to 6 (e.g., methane, ethane, acethylene, or benzene) may be used. As the hydrocarbon gas or the alcohol gas, for example, methanol, or ethanol may be used. When the source material is in the liquid state or the solid state, the source material may be brought into the gaseous state in advance, and then supplied to the CNT forming catalyst supporting bodies. When the source gas is the mixture of the hydrocarbon gas or the alcohol gas gas and the hydrogen gas, the mixture ratio (between the hydrocarbon gas or the alcohol gas and the hydrogen gas) is preferably 1 to 1 (1:1) to 1 to 20 (1:20) (partial pressure ratio or flow ratio).

After the carbon nanotube forming step is completed, the post-processing step is performed on the CNT fixation collecting members, when required. For example, the diameter of each tube is adjusted by further heating the carbon nanotubes at a temperature of 1500° C. to 1850° C. The end of each tube is opened by, for example, heating the formed carbon nanotubes in the air at a temperature of 500° C. to 600° C. (the air oxidation process), or performing the acid treatment using, for example, a hydrochloric acid or aqua regalis. In the acid treatment, in addition to the process for opening the end of each tube, the process for removing the CNT forming catalytic metal particles, which is performed after the carbon nanotubes are formed, the process for removing the soot, for example, amorphous carbon adhering to the carbon nanotubes, etc. may be performed.

The thus formed carbon nanotubes extend substantially perpendicularly from the surfaces of the carbon fibers serving as the base bodies. Because the cross section of each carbon fiber is circular, the carbon nanotubes extend outward in a radial pattern from carbon fiber serving as the core.

Next, an example of the method for forming the cell module 10 will be described. The cell module 10 is formed in the first CNT fixation collecting member fixing step, the first electrode catalyst supporting step, the electrolyte membrane forming step, the second CNT fixation collecting member fixing step, the second electrode catalyst supporting step, the collecting-assist member fixing step, and the application step.

In the first CNT fixation collecting member fixing step, the first SUS pipe (the first hollow-core conductor) 15 is prepared, the CNT fixing carbon fibers are aligned on the outer face of the first SUS pipe so that the outer face of the first SUS pipe is covered with the CNT fixing carbon fibers, and then the CNT fixing carbon fibers are bonded onto the outer face of the first SUS pipe, whereby the first carbon fiber layer 12 is formed. In the first electrode catalyst supporting step, the platinum (Pt) particles (the electrode catalytic metal particles) are caused to be supported on the carbon nanotubes formed on the carbon fibers fixed onto the outer face of the first SUS pipe 15. In the electrolyte membrane forming step, the fluoride ion-exchange resin membrane 11 is formed on the outer face of the first carbon fiber layer 12. In the second CNT fixation collecting member fixing step, the CNT fixing carbon fibers are aligned on the outer side of the ion-exchange resin membrane 11 so that the outer side of the ion-exchange resin membrane 11 is covered with the CNT fixing carbon fibers, and then the CNT fixing carbon fibers are bonded onto the outer face of the ion-exchange resin membrane 11, whereby the second carbon fiber layer 16 is formed. In the second electrode catalyst supporting step, the platinum (Pt) particles (electrode catalytic metal particles) are caused to be supported on the carbon fibers bonded onto the outer face of the ion-exchange resin membrane 11. In the collecting-assist member fixing step, the second SUS pipe 19, which presses, from the outside, the second carbon fiber layer 16 on which the platinum (Pt) particles are supported, is arranged. Preferably, this step is the hollow-core conductor fixing step, as in the first embodiment of the invention. In the application step, a proton-conducting substance is provided on each carbon nanotube 31, and a water-repellent material is further provided on the proton-conducting substance provided on each carbon nanotube 31.

The application step may be performed between the first electrode catalyst supporting step and the electrolyte membrane forming step and/or between the second electrode catalyst supporting step and the collecting-assist member fixing step, when required.

In the first CNT fixation collecting member fixing step, the first SUS pipe 15 to be arranged on the inner side of the cell module 10 is prepared, and the CNT fixing carbon fibers are aligned on the outer face of the first SUS pipe 15 so that the outer face of the first SUS pipe 15 is covered with the CNT fixing carbon fibers, and then the CNT fixing carbon fibers are bonded onto the outer face of the first SUS pipe 15, whereby a first intermediary body is formed. When required, pretreatments such as the cleaning and the surface treatment may be performed on the first SUS pipe 15. The method for aligning the CNT fixing carbon fiber on the outer face of the first SUS pipe so that the outer face of the first SUS pipe is covered with the CNT fixing carbon fibers is not limited to a certain method. Before the CNT fixing carbon fibers are fused onto the first SUS pipe 15, preferably, the CNT fixing carbon fibers are temporarily placed on the outer face of the first SUS pipe 15. For example, the CNT fixing carbon fibers may be temporarily placed on the outer face of the first SUS pipe 15 by an adhesive agent, the carbon fibers may be temporarily placed on the outer face of the first SUS pipe 15 by wetting the first SUS pipe 15 using a solvent selected from various solvents and then drying the first SUS pipe 15 with the CNT fixing carbon fibers placed thereon, or the CNT fixing carbon fibers may be temporarily placed on the outer face of the first SUS pipe 15 by winding the first SUS pipe 15 with the CNT fixing carbon fibers placed thereon using a adhesive tape or by binding the first SUS pipe 15 with the CNT fixing carbon fibers placed thereon using a cord-like member. If the carbon fibers are gathered along the fibrous direction and temporarily held together using, for example, an adhesive agent in advance, the carbon fibers are more easily aligned on the outer face of the first SUS pipe 15 so that the outer face of the first SUS pipe 15 is covered with the carbon fibers.

The CNT fixing carbon fibers aligned on the first SUS pipe 15 are bonded onto the first SUS pipe 15, whereby the first carbon fiber layer 12 (the first CNT fixation collecting member) is formed. The first intermediary body is thus formed. The method for bonding the CNT fixing carbon fibers onto the first SUS pipe 15 is not limited to a certain method. Preferably, the CNT fixing carbon fibers are bonded onto the first SUS pipe 15 by a conductive adhesive agent. When the first hollow-core conductor is made of metal as in the first embodiment of the invention, preferably, the CNT fixing carbon fibers are fused onto the first SUS pipe 15. The CNT fixing carbon fibers are fused onto the first SUS pipe 15, for example, by plasma process, high-frequency heating, or resistance welding.

In the first electrode catalyst supporting step, the platinum (Pt) particles (the electrode catalytic metal particles 32) are caused to be supported on the carbon nanotubes 31 formed on the carbon fibers 40 of the first intermediary body formed in the first CNT fixation collecting member fixing step, whereby a second intermediary body is formed. The platinum (Pt) particles are caused to be supported on the surfaces of the carbon nanotubes 31 by either the wet process or the dry process. In the wet process, preferably, a solution, obtained by dissolving an appropriate amount of a platinum chemical containing a chloroplatinic acid or a platinum nitric acid into alcohol such as ethanol, is applied onto the first intermediary body, and then the first intermediary body with the solution applied thereon is heated in the hydrogen atmosphere at a temperature of equal to or higher than 150° C. The solution is appropriately applied onto the first intermediary body, for example, by soaking the first intermediary body in the solution, or dropping or spraying the solution onto the outer face of the first intermediary body. In the dry process, preferably, the solution is applied onto the first intermediary body, for example, by the electronic beam evaporation method, the sputtering method, or the electrostatic coating method.

Next, the application step is performed, when required. In the application step, the Nafion layers 33, each of which has a thickness of approximately 10 nm, are formed by applying the Nafion solution (the proton-conducting substance) onto the carbon nanotubes 31 on which the platinum (Pt) particles are supported. In this case, the carbon nanotubes 31, on which the platinum (Pt) particles are supported and the Nafion layers 33 are formed, are transferred in the transfer step performed later.

When the application step is performed, preferably, the Nafion layers 33 are formed as described above, and the PTFE layers 34 are further formed by applying a polytetrafluoroethylene (PTFE: a water-repellent material) solution onto the Nafion layers 33.

In the application step, the Nafion layers 33 and the PTFE layers 34 may be formed using the Nafion solution (the solution containing the proton-conducting substance) and the PTFE solution (the solution containing the water-repellent material), respectively, by a known method, for example, the coating method or the soaking method. It is particularly preferable to employ the soaking method, because the solutions are uniformly applied onto the surface of each of the fine nanotubes.

In the first embodiment of the invention, Nafion is used as the proton-conducting substance. The Nafion polymer is dissolved in the solution in advance, and the solution is applied onto carbon nanotubes, and the carbon nanotubes with the solution applied thereon are dried, whereby the Nafion layers 33, namely, the proton-conducting substance layers 33 are formed. However, the substance from which the proton-conducting substance layers 33 are formed is not limited to Nafion. Also, the method by which the proton-conducting substance layers 33 are formed is not limited to the method described above. The proton-conducting substance layers 33 may be made of another substance. Also, the proton-conducting substance layers 33 may be formed by another method. For example, in the application step, the proton-conducting substance layers 33 may be formed in the following manner. The solution containing a styrensulfonic acid monomer is prepared instead of the Nafion solution, a polymer composition solution, obtained by adding additives such as a polymerization initiator selected from various types of polymerization initiators to the solution containing a styrensulfonic acid monomer when required, is used, the solution is applied to the CNT forming catalyst supporting bodies on which the carbon nanotubes 31 are formed, the carbon nanotubes 31 with the solution applied thereon are dried when required, and the proton-conducting substance layers 33 are polymerized by irradiating radioactive ray such as ultraviolet or heating. The proton-conducting substance layers 33 thus formed on the surfaces of the carbon nanotubes 31 have excellent adhesion. Preferably, a solution containing the water-repellent material is applied onto the proton-conducting substance layers 33 to form the water-repellent layers 34.

The second intermediary body, on which the platinum (Pt) particles are supported and, when required, the Nafion layer 33 and the PTFE layer 34 are formed, is formed in the manner described above. Next, the electrolyte membrane forming step is performed. In the electrolyte membrane forming step, a third intermediary body is formed by forming the fluorine ion-exchange resin membrane 11 on the outer face of the second intermediary body. The method for forming the fluorine ion-exchange resin membrane 11 is not limited to a certain method. For example, when the fluorine ion-exchange resin membrane 11 is used as the hollow-core electrolyte membrane as in the first embodiment of the invention, a fluorine ion-exchange resin solution, obtained by dissolving the fluorine ion-exchange resin in the solution mainly containing lower alcohol such as ethanol, may be prepared, and membranes may be formed from the solution, for example, by spraying, transfer, screen printing, or rolling. Alternatively, the third intermediary body may be formed in the following method. The fluorine ion-exchange resin membrane 11, formed in advance, is wound around the outer face of the second intermediary body. Then, the fluorine ion-exchange resin membrane 11 wound around the outer face of the second intermediary body is softened by applying heat so that the temperature of the fluorine ion-exchange resin membrane 11 becomes equal to or higher than the temperature at the glass transition point for the fluorine ion-exchange resin membrane 11. The fluorine ion-exchange resin membrane 11 is then cooled. Thus, the fluorine ion-exchange resin membrane 11 is bonded onto the second intermediary body (hot pressing).

The electrolyte membrane forming step greatly varies depending on the types of the solid electrolytes to be used. The electrolyte membrane may be formed basically according to a known method, and method may be modified when required. Either the heat-labile substance or the acid-labile substance is not used in the second intermediary body according to the first embodiment of the invention. Accordingly, a membrane selected from almost any types of known electrolyte membranes may be formed on the second intermediary body.

For example, the polymer electrolyte membrane, described, for example, in Japanese Patent Application Publication No. JP-A-11-503262, which is formed of the complex of a strong acid with a basic polymer, formed by doping a basic polymer such as polybenzimidazole, polypryimidine, or polybenzoxazole with a strong acid, may be formed. In this case, the basic polymer membrane is formed on the second intermediary body, and then a strong acid is caused to act on the basic polymer.

In the electrolyte membrane forming step, the inorganic proton conductor such as hydrogelated phosphate glass described in page 69, No. 3, Vol. 3 of "Fuel Cell" written by Toshihiro Kasuga (issued in 2004) may be used. In this case, i) the powder of calcium phosphate glass, which has a linear structure where ions such as alkali metal ions, alkali earth metal ions or zinc ions are coordinated, and distilled water are mixed with each other at a predetermined ratio, (ii) the mixture is matured to form the transparent gelatinous material, and (iii) the formed material is applied onto the outer face of the second intermediary body and the second intermediary body with the formed material applied thereon is heated, whereby the formed material is hardened, and the hydrate layered crystal is deposited. Thus, the crystal-gel complex having no fluidity is formed. The third intermediary body is obtained in the electrolyte membrane forming step.

Alternatively, the proton conductor formed, for example, of porous glass, which is described in page 410, No. 4, Vol. 57 of "Chemistry and Industry" written by Masayuki Nogami (issued in 2004), may be used. In this case, the porous glass mainly containing $SiO_2$ is formed in the following manner. Alkoxide such as $Si(OC_2H_5)_4$, $PO(OCH_3)_3$, or $Zr(OC_4H_9)_4$ is used as an ingredient, the alkoxide is hydrolyzed in the aqueous solution and applied onto the outer face of the second intermediary body, and the second intermediary body with the alkoxide applied thereon is heated at a temperature of 400° C. to 800° C. Thus, the third intermediary body is obtained.

An organic-inorganic hybrid solid electrolyte membrane imparted with proton conductivity by introducing an organic compound in the pores formed in the porous glass, which is described in page 41, No. 1, Vol. 57 of "Chemistry and Industry" written by Koji Kuraoka, Takashi Kikukawa, and Tetsuo Yazawa (issued in 2004) may be used. In this case, $SiO_2$, $Na_2CO_3$, $H_3BO_3$, $Al(OH)_3$ are mixed together, and the mixture is fused at a temperature of 1200° C. to 1400° C., the mixture is then applied onto the outer face of the second intermediary body, and the mixture is matured at a temperature of 800° C. to 1100° C., whereby borosilicate glass is formed. Then, phase-separation process is performed on the borosilicate glass, more specifically, the borosilicate glass is heated at a temperature of 500° C. to 600° C., whereby porous glass is formed. Then, the porous glass is soaked in the solution in which an organosilicon compound such as mercaptopropyltrimethoxysilane is dissolved, and then heated to reflux. In this process, an organic-inorganic nanohybrid polymer electrolyte membrane is formed from the porous glass by silane coupling reaction. Finally, the oxidation treatment is performed on the electrolyte membrane to develop proton-conductivity, whereby the third intermediary body is formed.

In the second CNT fixation collecting member fixing step, the CNT fixing carbon fibers are aligned on the outer face of the fluorine ion-exchange resin membrane 11 of the third intermediary body so that the outer face of the fluorine ion-exchange resin membrane 11 is covered with the CNT fixing carbon fibers, and the CNT fixing carbon fibers are bonded onto the outer face of the fluorine ion-exchange resin membrane 11. Thus, a fourth intermediary body is formed.

The nano-columnar bodies have adhesion, although it is weak, to many types of substances. Accordingly, in the first embodiment of the invention, the CNT fixing carbon fibers are aligned on the electrolyte membrane such as the fluorine ion-exchange resin membrane 11 so that the electrolyte membrane is covered with the CNT fixing carbon fibers, whereby the CNT fixing carbon fibers are bonded onto the electrolyte membrane. Thus, the fourth intermediary body is formed. When the CNT fixing carbon fibers are not sufficiently bonded to the electrolyte membrane only by the adhesion of the nano-columnar bodies, for example, when the inorganic proton conductor is used, the CNT fixation collecting member components may be bonded to the electrolyte membrane using, for example, a conductive adhesive agent.

Fusion bonding is considerably effective at bonding the CNT fixing carbon fibers onto the SUS pipe in the first CNT fixation collecting member fixing step. However, if fusion bonding is performed in the second CNT fixation collecting member fixing step, the electrolyte membrane is likely to deteriorate. Accordingly, it is preferable to use the adherence of the nano-columnar bodies or the adhesive agent to bond the CNT fixing carbon fibers onto the SUS pipe, instead of performing fusion bonding.

In the second electrode catalyst supporting step, the platinum (Pt) particles (the electrode catalytic metal particles 32) are caused to be supported on the carbon nanotubes 31 formed on the carbon fibers forming the second carbon fiber layer 16 of the fourth intermediary body, whereby a fifth intermediary body is formed. The second electrode catalyst supporting step may be performed in the same manner in which the first electrode catalyst supporting step is performed. Also, the application step may be performed.

In the second collecting-assist member fixing step, the second SUS pipe 19 that is the hollow-core conductor is arranged on the outer side of the fifth intermediary body, whereby the cell module 10 is formed. The cell module 10 may be formed, for example, in the method in which the second SUS pipe 19 is expanded, for example, by heating, the fifth intermediary body is inserted in the hollow portion, and then the second SUS second pipe 19 with the fifth intermediary body inserted therein is cooled to connect the second SUS pipe 19 and the fifth intermediary body to each other. When a spring-shaped member is used as the second collecting-assist member, the spring member is expanded, the fifth intermediary body is inserted into the expanded spring member, and then the spring is returned to the original state, whereby the second SUS pipe 19 and the fifth intermediary body are connected to each other.

When the sheet-like conductive material such as a carbon sheet is used as the second collecting-assist member, a conductive adhesive agent is applied onto one of the faces of the sheet-like conductive material, which will be used as the inner face, and then the sheet-like conductive material is wound around the fifth intermediary body. Thus, the cell module 10 is formed.

Various modifications may be made to the methods for forming the cell module 10 described above.

For example, the electrode catalysts may be caused to be supported on the components (the CNT fixing carbon fibers) of the CNT fixation collecting members in advance, and the first CNT fixation collecting member fixing step and/or the second CNT fixation collecting member fixing step may be performed using the CNT fixation collecting members on which the electrode catalysts are supported. Thus, the first electrode supporting step and/or the second electrode catalyst supporting step are/is omitted.

In the first embodiment of the invention described so far, the tubular (hollow-core) cell module 10 that is open at the both ends is used. In this case, the fuel gas containing hydrogen or the liquid fuel such as methanol is supplied to the inside of the cell module 10, and the oxidant gas containing oxygen is supplied to the outside of the cell module 10, whereby the cell module 10 generates electric power. However, the invention is not limited to this. The oxidant gas containing oxygen may be supplied to the inside of the fuel cell 10 and the fuel gas containing hydrogen or the liquid fuel such as methanol may be supplied to the outside of the cell module 10, whereby the cell module 10 generates electric power. In this case, the inner side electrode and the outer side electrode are exchanged.

The cell module according to the invention is not limited to the cell module that is open at the both ends. Instead of such cell module, a hollow-core cell module that is closed at one end may be used. In this case, because the hollow portion of the cell module is closed at one end, it is preferable to use up the entire reaction gas introduced in the hollow portion in the tube. The volume of oxygen, which is the actual reaction gas in the air and which is usually used as the oxidant gas, is only one thirds of the volume of the air. Therefore, even after the entire oxygen is used up by the electrode reaction, unreactive gas mainly containing nitrogen remains. Accordingly, when the hollow-core cell module that is closed at one end is used, preferably, the reaction gas or the reaction liquid to be introduced into the hollow portion is the fuel gas, and the oxidant gas such as air is supplied to the outside of the cell module.

The hollow-core shape according to the invention is not limited to a tubular shape. Any hollow-core shapes may be employed, as long as the reaction components required for electrochemical reaction can be supplied to the electrode on the inner side by supplying the reaction gas into the hollow-core portion. Also, the shape of the cross section of the hollow-core electrolyte membrane is not limited to a circular shape. The cross section of the hollow-core electrolyte membrane may be in any shapes.

Figure 4:
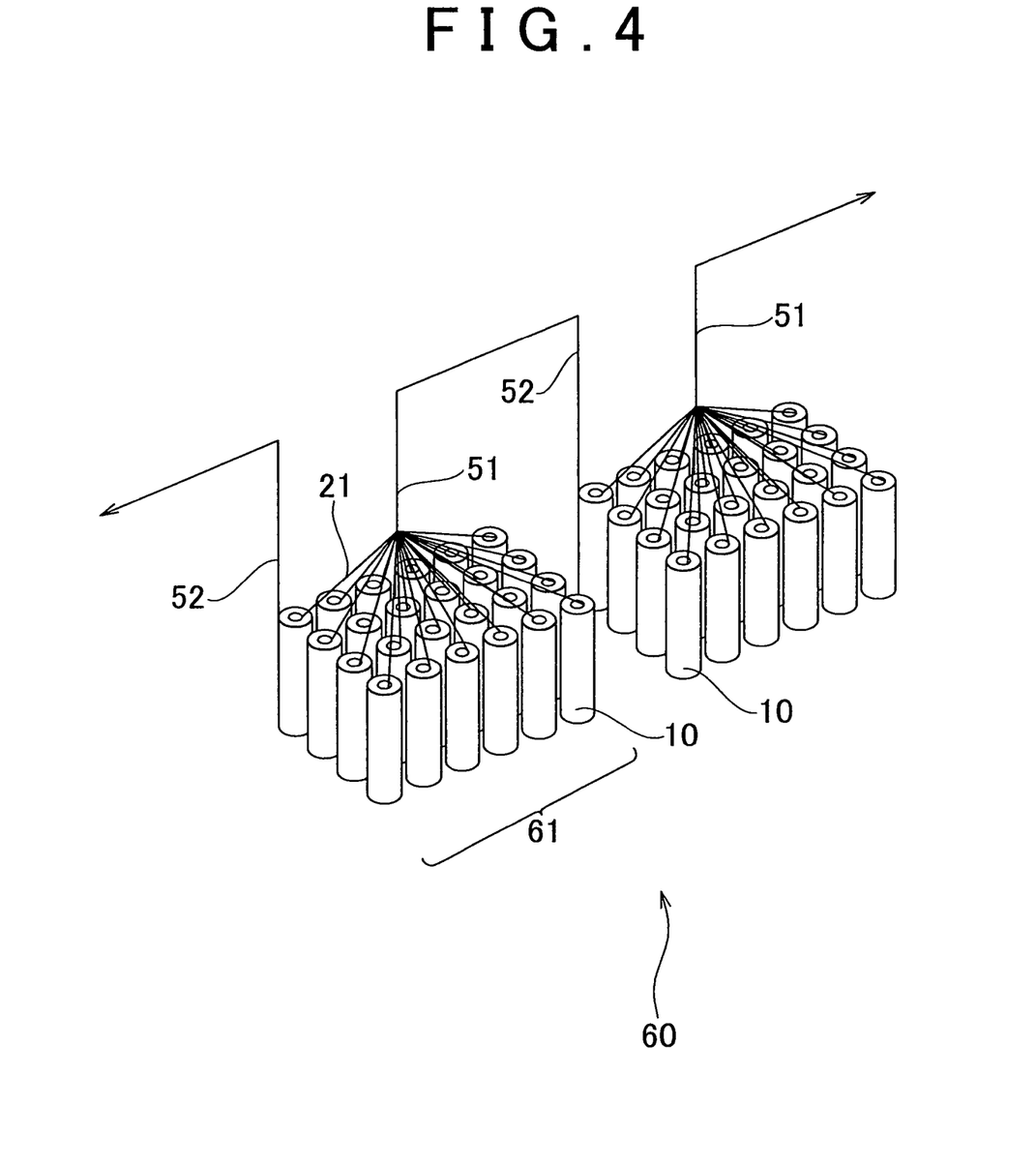
FIG. 4 is the view schematically showing a fuel cell formed by gathering the cell modules.

FIG. 4 is the view for describing the fuel cell 60 formed of multiple cell modules formed in the steps described above. In order to actually use the fuel cell 60, a cell module assembly 61 is formed by connecting an appropriate number of cell modules 10 to each other in parallel, then an appropriate number of the cell module assemblies 61 are connected to each other in series. Thus, a required output is produced.

In the cell module 10 according to the first embodiment of the invention, the electrode catalytic metal particles 32 are supported on the carbon nanotubes 31 formed on the carbon fibers 40 of the carbon fiber layers 12, 16 that are the CNT fixation collecting members, and part of carbon nanotubes 31 are fixed to the carbon fibers 40 so as to be oriented toward the hollow-core electrolyte membrane 11. Accordingly, the electrode catalytic metal particles 32 are highly densely supported on the carbon nanotubes 31, and the reaction gas supplied for the electric power generation easily comes close to the three-phase interfaces formed on the carbon nanotubes 31 to be uniformly dispersed. Accordingly, the areas on and around the carbon fibers 40, where there are the carbon nanotubes 31, more specifically, the portions in the areas, where there are the carbon nanotubes 31 oriented toward the hollow-core electrolyte membrane 11, function as the electrodes 13, 17, and the electrode catalytic metal particles 32 supported on the carbon nanotubes 31 are efficiently used for the electrode reaction.

In the cell module 10 according to the first embodiment of the invention, as shown in FIG. 3, the carbon nanotube 31 is connected, at one end, to the surface of the carbon fiber 40, and contacts, at the other end, the hollow-core electrolyte membrane 11 while being oriented toward the hollow-core electrolyte membrane 11. Therefore, although the structure, where it is difficult to apply a surface pressure between the collecting members 16, 17 and the other components of the cell module 10 because the hollow-core electrolyte membrane 11 is used, is employed, it is possible to provide appropriate electric connection between the electrolyte membrane 11 and the first electrode 13/the first collecting member 14, and between the electrolyte membrane 11 and the second electrode 17/the second collecting member 18. Therefore, the cell module for a fuel cell according to the first embodiment of the invention has low internal resistance and high electric power generation efficiency. Also, the fuel cell, in which the cell module according to the first embodiment of the invention is used as the basic power generation unit, has high electric power generation efficiency.

According to the invention, even when the nano-columnar bodies made, for example, of nano-glass that has lower electric conductivity than that of carbon nanotubes are used, appropriate electric connection between the cell module and the collecting members is maintained. The reason for this may be estimated as follows. Microscopically, multiple nano-columnar bodies are formed between the hollow-core electrolyte membrane and the collecting members so as to be substantially perpendicular to the hollow-core electrolyte membrane and the collecting members. Also, the surfaces of the nano-columnar bodies may be used as appropriate water passages. The electrode catalysts, supported on the nano-columnar bodies and located near the collecting members, are supplied with ions from the surfaces of the nano-columnar bodies and supplied with the reaction gas from the gas phase, thereby causing electrode reaction. The generated electric charges are moved to the collecting members by a mechanism such as a hopping mechanism. Namely, forming reaction fields near the collecting members using the nano-columnar bodies enables the generated electric charges to immediately move to the collecting members, for example, by the hopping mechanism. It is, therefore, considered that appropriate electric connection is provided between the cell module and the collecting members.

Hereafter, a cell module 70 according to a second embodiment of the invention will be described with reference to FIG. 5. The cell module 70 according to the second embodiment differs from the cell module 10 according to the first embodiment in that the carbon fibers forming the carbon fiber layers 72, 76 that are the CNT fixation collecting members are short.

The fuel used for electric power generation may be the same as that used in the first embodiment. The same or corresponding components as those in the first embodiment will be denoted by the same reference numerals and detail description thereof will not be provided below.

Figure 5:
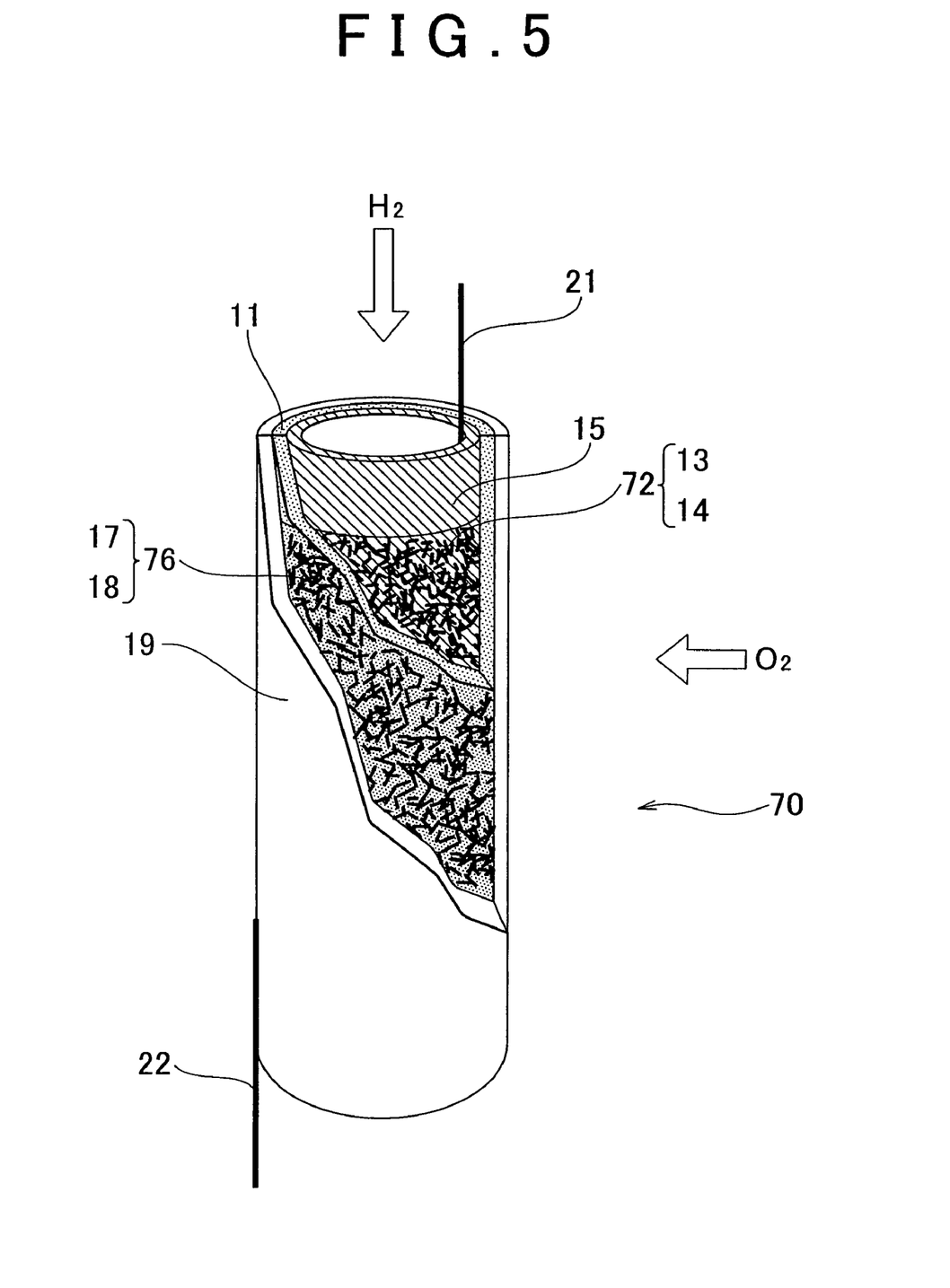
FIG. 5 is the perspective view schematically showing a cell module according to a second embodiment of the invention.

In the cell module 70 shown in FIG. 5, the first carbon fiber layer (CNT fixation collecting member) 72 is arranged on the inner side of the tubular fluorine ion-exchange resin membrane 11, and the first SUS pipe 15 is arranged on the inner side of the first carbon fiber layer 72. The second carbon fiber layer (CNT fixation collecting member) 76 is arranged on the outer side of the tubular fluorine ion-exchange resin membrane 11, and the second SUS pipe 19 is arranged on the outer side of the second carbon fiber layer 76. The conductive wires 21, 22 are fitted to the first SUS pipe 15 and the second SUS pipe 19, respectively.

The carbon fiber layers 72, 76 are formed by stacking multiple short carbon fibers in layers so that the multiple short carbon fibers are closely bonded to each other. As in the carbon fibers according to the first embodiment of the invention, the carbon nanotubes on which the electrode catalysts are supported are formed on the each of the short carbon fibers. As in the first embodiment of the invention, part of the carbon nanotubes formed on the short carbon fibers are bonded to the fluorine ion-exchange resin membrane 11 while being oriented toward the fluorine ion-exchange resin membrane 11. Preferably, the length of each short carbon fiber is equal to or less than 10 mm, because such short carbon fibers are easily dispersed in a solution. In the viewpoint of ease in handling the short carbon fibers as the base bodies on which the carbon nanotubes are formed, the length of each short carbon fiber is preferably equal to or longer than 1 mm.

In the carbon fiber layers 72, 76, the areas on and around the short carbon fibers, where there are the carbon nanotubes, more specifically, in the portions in the areas, in which there are the carbon nanotubes oriented toward the hollow-core electrolyte membrane 11 serve as the electrodes 13, 17, and the short carbon fibers that are the base bodies on which the carbon nanotubes are formed serve as the collecting members 14, 18. Also, the first and second SUS pipes 15, 19 arranged adjacent to the carbon fiber layers 72, 76, are the collecting-assist members that are used to reinforce the carbon fiber layers 72, 76 and assist the carbon fiber layers 72, 76 in collecting electric charges, respectively.

Accordingly, in this case, on the inner side of the hollow-core electrolyte membrane 11, the electrode and the collecting member are integrally formed by the first carbon fiber layer 72 and the first SUS pipe 15. Similarly, on the outer side of the hollow-core electrolyte membrane 11, the electrode and the collecting member are integrally formed by the second carbon fiber layer 76 and the second SUS pipe 19.

Next, the method for forming the cell module 70 according to the second embodiment of the invention will be described below.

The first carbon fiber layer 72 is formed on the first SUS pipe 15, which is the hollow-core conductor, to form the first intermediary body, for example, in the first CNT fixation collecting member coating step. In the first CNT fixation collecting member coating step, first, the short carbon fibers on which the carbon nanotubes are formed are dispersed in the solution, and the composition for forming of the CNT fixing carbon fiber layer is formed by adding an additive selected from various additives to the solution when required, and the outer face of the first SUS pipe 15 prepared in advance is coated with the CNT fixing carbon fiber layer forming composition. Although the liquid used as the solution is not limited to a certain liquid, for example, acetone is preferably used. Examples of preferable additives include a conductive filler that is the component used in a conductive adhesive agent, various types of thermoplastic resins and thermosetting resins that serve as binders, the precursors of these binders, and Nafion.

As in the first embodiment of the invention, the second intermediary body is formed by performing the first electrode catalyst supporting step, in which the platinum (Pt) particles (the electrode catalytic metal particles) are caused to be supported on the carbon nanotubes formed on the carbon fibers contained in the carbon fiber layer 72 of the first intermediary body. Further, as in the first embodiment of the invention, the third intermediary body is formed by performing the electrolyte membrane forming step, in which the fluorine ion-exchange resin membrane 11 is formed on the outer face of the second intermediary body.

The second CNT fixation collecting member coating step, which is similar to the first CNT fixation collecting member coating step, is performed on the surface of the third intermediary body, whereby the fourth intermediary body, in which the second carbon fiber layer 76 is formed on the outer face of the ion-exchange resin membrane 11, is formed.

As in the first embodiment of the invention, in the second electrode catalyst supporting step, the platinum (Pt) particles (the electrode catalytic metal particles) are caused to be supported on the carbon nanotubes formed on the carbon fibers contained in the carbon fiber layer 76 of the fourth intermediary body, whereby the fifth intermediary body is formed. Finally, as in the first embodiment of the invention, the second SUS pipe 19, which fixes the fifth intermediary body from the outside, is arranged in the second collecting-assist member fixing step. The application step, in which the proton-conducting substance is provided on the carbon nanotubes, and the water-repellant material is arranged on the carbon nanotubes provided with the proton-conducting substance, may be performed between the second electrode catalyst supporting step and the electrolyte membrane forming step and/or between the second electrode catalyst supporting step and the second hollow-core conductor fixing step (the second collecting-assist member fixing step) when required, as in the first embodiment.

The electrode catalysts may be caused to be supported on the carbon fibers in advance, and the first CNT fixation collecting member coating step and/or the second CNT fixation collecting member coating step may be performed using the electrode catalysts supported on the carbon fibers. Thus, the first electrode catalyst supporting step and/or the second electrode catalyst supporting step may be omitted, as in the first embodiment of the invention.

As described so far, in the second embodiment of the invention, the carbon fibers are used as the base bodies on which the carbon nanotubes are formed and also as the components of the CNT fixation collecting members. Because the carbon fibers are dispersed in the solvent, the carbon fiber layer that is the CNT fixation collecting member is easily formed on the conductive member such as the SUS pipe by spraying.

In the second embodiment of the invention, the components of the CNT fixation collecting member are the carbon fibers. However, the components of the CNT fixation collecting members may be another conductive material, for example, metal fibers, or the metal wires. Alternatively, the components of the CNT fixation collecting members may be, for example, power carbon, or metal or conductive ceramic.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are examples, other combinations and configurations, including more, less or only a single element, are also within the spirit and scope of the invention.

What is claimed is:

1. A cell module for a fuel cell, comprising:
   a hollow-core electrolyte membrane;
   two electrodes one of which is arranged on an inner face of the hollow-core electrolyte membrane and the other of which is arranged on an outer face of the hollow-core electrolyte membrane; and
   collecting members that are connected to the respective two electrodes, wherein
   at least one of the two electrodes includes nano-columnar bodies on which electrode catalysts are supported, the nano-columnar bodies are formed on at least one of the collecting members corresponding to the at least one of the electrodes that includes the nano-columnar bodies, each of the collecting members is formed of at least one conductive fiber, the nano-columnar bodies are each perpendicularly fixed in relationship to a surface of the at least one conductive fiber, and at least part of the nano-columnar bodies are oriented toward the hollow-core electrolyte membrane.

2. The cell module according to claim 1, wherein
   the at least one conductive fiber is aligned in a longitudinal direction of the hollow-core electrolyte membrane.

3. The cell module according to claim 1, further comprising:
   a collecting assist member that is arranged on at least one of an inner side and an outer side of the electrolyte membrane with the at least one of the collecting members, on which the nano-columnar bodies are formed, interposed between the collecting assist member and the hollow-core electrolyte membrane.

4. The cell module according to claim 2, further comprising:
   a collecting assist member that is arranged on at least one of an inner side and an outer side of the electrolyte membrane with the at least one of the collecting members, on which the nano-columnar bodies are formed, interposed between the collecting assist member and the hollow-core electrolyte membrane.

5. The cell module according to claim 1, wherein
   a length of each of the nano-columnar bodies is equal to or longer than 200 mm.

6. The cell module according to claim 1, wherein
   the nano-columnar bodies are oriented toward the face of the hollow-core electrolyte membrane in a direction substantially perpendicular to the face of the hollow-core electrolyte membrane.

7. The cell module according to claim 1, wherein
   the electrode catalysts are made of platinum or an alloy of platinum and another metal.

8. The cell module according to claim 1, wherein
   a proton conducting substance is provided on a surface of each of the nano-columnar bodies.

9. The cell module according to claim 8, wherein
   a water-repellent material is further provided on the proton conducting substance.

10. The cell module according to claim 1, wherein
    a grain diameter of each of the electrode catalysts is equal to or less than an outer diameter of each of the nano-columnar bodies.

11. The cell module according to claim 8, wherein
    a thickness of the proton conducting substance is 1 mm to 70 mm.

12. A fuel cell, comprising:
    the cell module according to claim 1.

13. The cell module according to claim 1, wherein
    the at least one conductive fiber comprises at least one carbon fiber.

* * * * *

UNITED STATES PATENT AND TRADEMARK OFFICE
CERTIFICATE OF CORRECTION

PATENT NO. : 7,977,009 B2  Page 1 of 1
APPLICATION NO. : 11/639146
DATED : July 12, 2011
INVENTOR(S) : Haruyuki Nakanishi et al.

It is certified that error appears in the above-identified patent and that said Letters Patent is hereby corrected as shown below:

Title Page, Item (75) Inventors, the city of the fifth inventor (Kiyomi Kozuka) should be "Ama-gun (JP)", instead of --Aichi-ken (JP)--.

Signed and Sealed this
Twenty-fifth Day of October, 2011

David J. Kappos
*Director of the United States Patent and Trademark Office*